Patented Aug. 31, 1926.

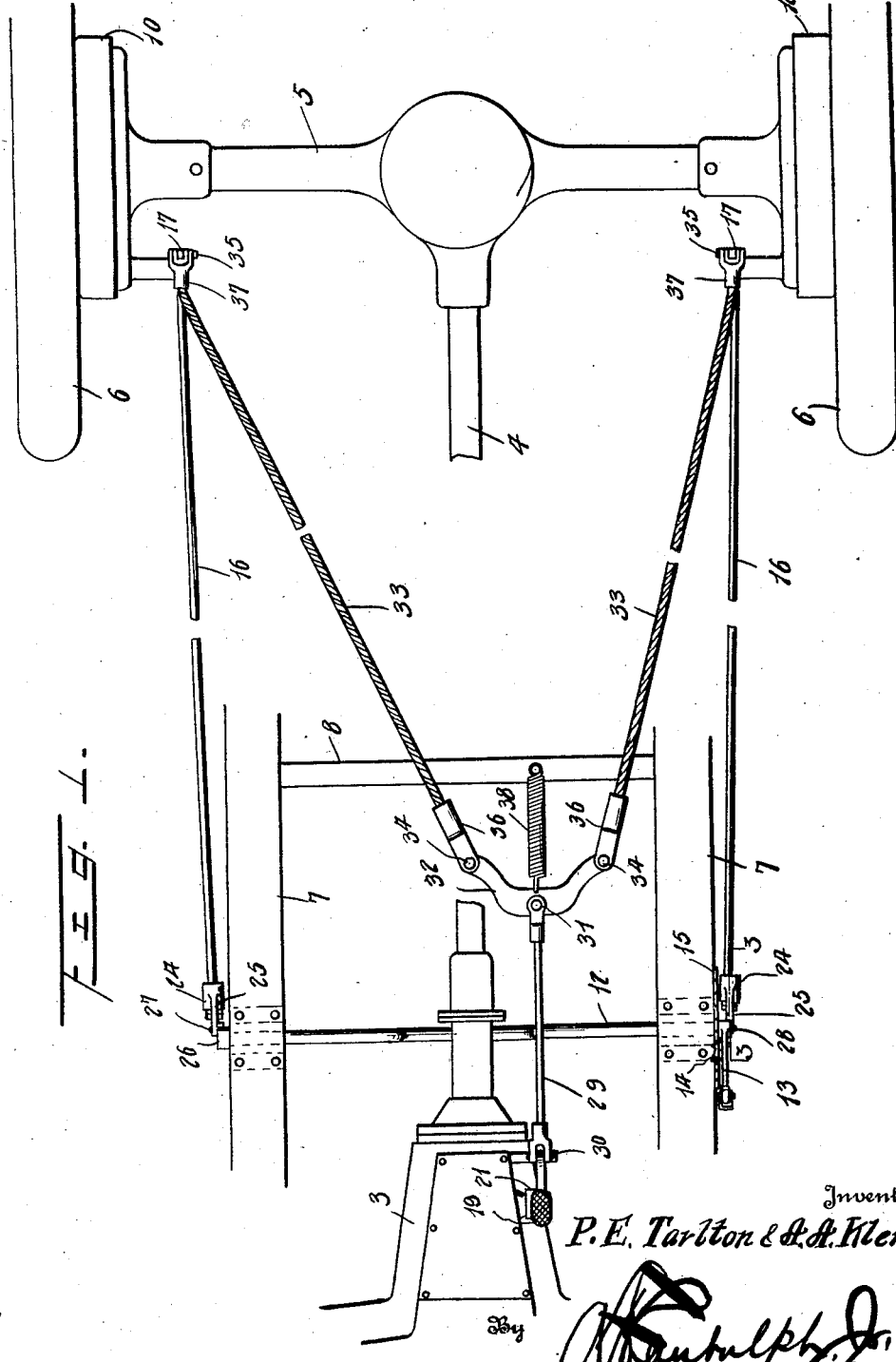

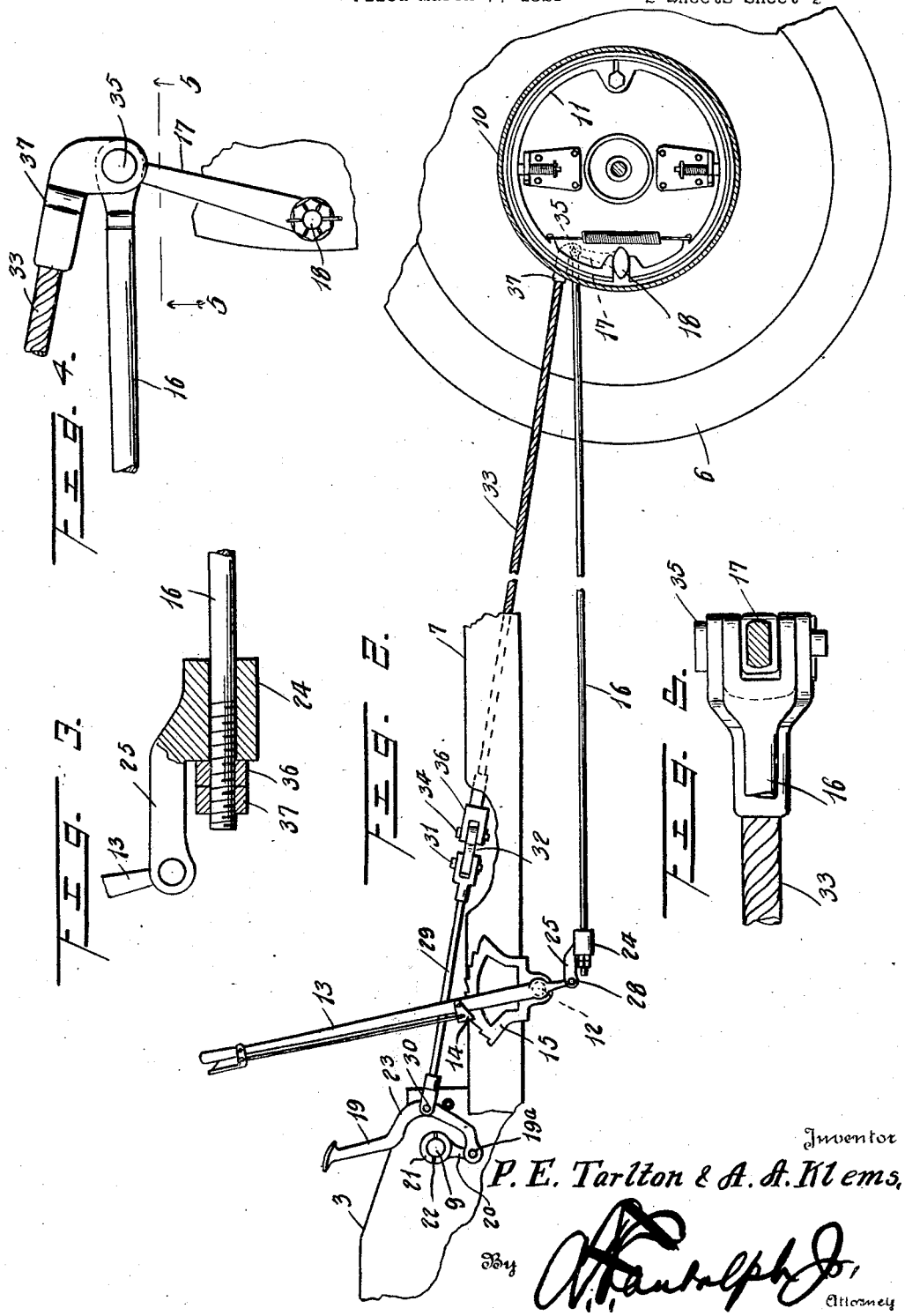

1,598,174

UNITED STATES PATENT OFFICE.

PERLE E. TARLTON AND ALBERT A. KLEMS, OF LOS ANGELES, CALIFORNIA.

ATTACHMENT FOR AUTOMOBILE BRAKES.

Application filed March 7, 1925. Serial No. 13,787.

This invention relates to automobile brakes of that type comprising a transmission shaft brake adapted to be applied by means of a foot lever and wheel brakes adapted to be applied by means of a hand lever. A braking system of this kind is used on Ford automobiles, and the transmission shaft brake and the wheel brakes are capable of independent application only.

The invention has for one of its objects the provision of a novel, simple and inexpensive attachment through the medium of which the transmission shaft and wheel brakes may be simultaneously applied by means of the foot lever, whereby to permit the automobile to be more quickly brought to a stop and prevent the wear and chatter resulting from the application of the brakes independently.

A further object of the invention is the provision of an attachment of the character stated which will not interfere with the application of the wheel brakes by means of the hand lever and which may be readily applied.

With the above and other objects in view, the invention consists of the construction, combination and arrangement of parts hereinafter fully described and claimed, and illustrated in the accompanying drawings, wherein:

Figure 1 is a top plan view illustrating the application of the attachment to a braking system of the character set forth, Figure 2 is a view in side elevation of the parts shown in Figure 1 with one rear wheel omitted and the brake drum of such wheel in vertical section, Figure 3 is a detail sectional view on an enlarged scale taken on the plane indicated by the line 3—3 of Figure 1, Figure 4 is a detail view in side elevation on an enlarged scale, illustrating the manner in which the attachment is connected to the levers and the wheel brakes, and Figure 5 is a detail sectional view taken on the plane indicated by the line 5—5 of Figure 4.

Corresponding and like parts are referred to in the following description, and designated in the several views of the accompanying drawings, by similar reference characters.

In the drawings 3 denotes the planetary transmission housing, 4 the drive shaft, 5 the rear axle housing, 6 the rear wheels, and 7 and 8 the side and one cross bar, respectively, of the chassis of an automobile of that type employing a foot operated transmission shaft brake and hand operated wheel brakes. The transmission shaft brake is located within the housing 3, and the operating shaft 9 thereof projects beyond one side of the housing to permit the application thereto of the foot lever. The wheel brakes comprise drums 10, brake bands 11 arranged within the drums, a shaft 12 journaled on the side bars 7, a hand lever 13 fixed to the shaft 12 and provided with a pawl 14 arranged in cooperative relation with a notched sector 15, and rods 16 connecting the shaft 12 and the lever 13 to the levers 17 of the brake band expanding cams 18.

In accordance with our invention, the foot lever 19 of the transmission shaft brake is pivotally connected as at 19$^a$ to an arm 20 which is secured to and depends from the shaft 9. The arm 20 is carried by a collar 21 mounted on the shaft 9 and fixed thereto by a pin 22. At a point intermediate its ends the foot lever 19 is as shown at 23 of substantially arcuate formation in order to prevent the collar 21 and shaft 9 from shortening or interfering with the throw or depression thereof. The rods 16 are connected to the shaft 12 and hand lever 13 for forward movement independently of these parts when the foot lever 19 is depressed to apply the transmission shaft brake and wheel brakes and for forward movement with these parts when the hand lever 13 is pulled rearwardly to apply the wheel brakes. The connection between these parts is established by bearings 24 which slidably receive the front ends of the rods 16 and which are provided with forwardly extending arms 25 pivotally connected at their front ends to the lower end of the hand lever 13 and to a crank arm 26 on the shaft 12, as indicated at 28 and 27, respectively. A drag link 29 is pivotally connected as at 30 to the arcuate portion 23 of the foot lever 19, and is pivotally connected as at 31 to a substantially U-shaped equalizing member or bar 32. Cables 33 are pivotally connected as at 34 to the terminals of the equalizing bar 32, and are pivotally connected as at 35 to the wheel brake levers 17. At their front ends, the cables 33 are firmly secured in the sockets or clevises 36 which are in turn connected to the equalizing bar 32 by the pivots 34. The rear ends of the cables 33 are firmly secured in sockets of clevises 37. These clevises are of angular formation, and the lower ends of the substantially vertical arms thereof are connected to the levers 17 by the pivots 35 which also connect the rear ends of the rods 16 to these levers.

As the lever 19 is connected it constitutes a floating equalizing and operating lever which is entirely supported by the movable parts to which it is connected and which is capable of functioning as a lever of the first order or a lever of the second order, that is, when said lever is depressed, or moved forwardly, the elements 20 and 29 will be moved in opposite directions to operate both the transmission brake and the wheel brakes, and should the wheel brakes be first applied said lever 19 will fulcrum on the pivot connection 30 and function as a lever of the first order to operate the transmission brake, while should the transmission brake be first applied said lever will fulcrum on the pivot connection 19ᵃ and function as a lever of the second order to operate the wheel brake. It will thus be apparent that an absolute equalization of the application of the transmission or power shaft brake and the wheel brakes will be attained. As the front ends of the rods 16 have slidable connection with the hand lever 13 and shaft 12, said lever and shaft will not interfere with the application of the wheel brakes by the foot lever 19. In order to permit the wheel brakes to be applied by the hand lever 13, stop nuts 36 and lock nuts 37 are carried by the front ends of the rods 16 forwardly of the bearings 24. As the cables 33 are flexible, the attachment will not in any way interfere with the application of the wheel brakes by the hand lever 13. A spring 38 secured to the cross bar 8 and equalizing bar 32 functions to return the foot lever 19 and the parts of the attachment to their normal positions promptly upon the release of the foot lever 19.

From the foregoing description, taken in connection with the accompanying drawings, the advantages of the construction and of the method of operation of our invention will be readily apparent to those skilled in the art to which the same appertains. While we have described the principle of operation of the invention, together with the structure which we now consider to be the best embodiment thereof, we desire to have it understood that the structure shown is merely illustrative, and that such changes may be made when desired as are within the scope of the invention as claimed.

What is claimed is:—

1. In a vehicle having wheel brakes and a transmission brake, the combination of: an operating lever and equalizing means connecting said lever with said wheel brakes and said transmission brake so that all of said brakes are uniformly applied by said lever.

2. In a vehicle having wheel brakes and a transmission brake provided with an operating shaft, the combination of: an arm on said shaft; operating connections associated with said wheel brakes; and a floating operating lever pivotally connected to said arm and to said operating connections.

3. In a vehicle having wheel brakes and a transmission brake provided with an operating shaft, the combination of: an arm on said shaft; operating connections associated with said wheel brakes; and a floating operating lever pivotally connected to said arm and to said operating connections, said lever being entirely supported by its pivotal connections.

4. In a vehicle having wheel brakes and a transmission brake provided with an operating shaft, the combination of: an arm on said shaft; an equalizing bar; connections between said equalizing bar and said wheel brakes; a drag bar connected to said equalizing bar; and a floating operating lever pivotally connected to said arm and to said drag bar.

5. In a vehicle having wheel brakes and a transmission brake provided with an operating shaft, the combination of: an arm on said shaft; an equalizing bar; connections between said equalizing bar and said wheel brakes; a drag bar connected to said equalizing bar; and a floating operating lever pivotally connected to said arm and to said drag bar, said lever being entirely supported by said arm and said drag bar.

6. In a vehicle having wheel brakes and a transmission brake: operating connections associated with said wheel brakes; other operating connections associated with said transmission brake; and a floating operating lever operatively connected to both of said operating connections and functioning to apply an equalized braking effort to all of said brakes, said lever functioning as a lever of the first order when the wheel brakes grip ahead of said transmission brake and as a lever of the second order when the transmission brake grips ahead of the wheel brakes.

In testimony whereof we affix our signatures.

PERLE E. TARLTON.
ALBERT A. KLEMS.